US010854158B2

(12) United States Patent
Morein

(10) Patent No.: US 10,854,158 B2
(45) Date of Patent: Dec. 1, 2020

(54) DISPLAY DRIVER WITH REDUCED VOLTAGE DROOP

(71) Applicant: SYNAPTICS INCORPORATED, San Jose, CA (US)

(72) Inventor: Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 85 days.

(21) Appl. No.: 16/119,884

(22) Filed: Aug. 31, 2018

(65) Prior Publication Data

US 2020/0074948 A1 Mar. 5, 2020

(51) Int. Cl.
*G09G 3/36* (2006.01)
*H02M 3/07* (2006.01)

(52) U.S. Cl.
CPC .......... *G09G 3/3674* (2013.01); *H02M 3/07* (2013.01); *G09G 2310/0291* (2013.01); *G09G 2330/02* (2013.01)

(58) Field of Classification Search
CPC .......... G09G 3/3674; G09G 2330/02; G09G 2310/0291; H02M 3/07; H01L 27/0222
See application file for complete search history.

(56) References Cited

U.S. PATENT DOCUMENTS

| | | | |
|---|---|---|---|
| 10,090,758 B1 | 10/2018 | Li et al. | |
| 2008/0094129 A1* | 4/2008 | Tahata | H02M 3/07 327/536 |
| 2009/0079495 A1* | 3/2009 | Morita | H02M 3/07 327/538 |
| 2012/0098822 A1* | 4/2012 | Kim | G09G 3/003 345/419 |
| 2016/0260409 A1* | 9/2016 | Lin | G09G 3/20 |

* cited by examiner

*Primary Examiner* — Kent W Chang
*Assistant Examiner* — Chayce R Bibbee
(74) *Attorney, Agent, or Firm* — Patterson + Sheridan, LLP

(57) ABSTRACT

A system and method for updating a display device comprises a first charge pump configured to drive a first gate line of the display device with a first voltage during a first period, a second charge pump configured to transition the first gate line from the first voltage to a second voltage during a second period, a third charge pump configured to drive the first gate line with the second voltage during a third period, and a fourth charge pump configured to transition the first gate line from the second voltage to the first voltage during a fourth period, wherein the first period occurs before the second period, the second period occurs before the third period, and the third period occurs before the fourth period.

20 Claims, 11 Drawing Sheets

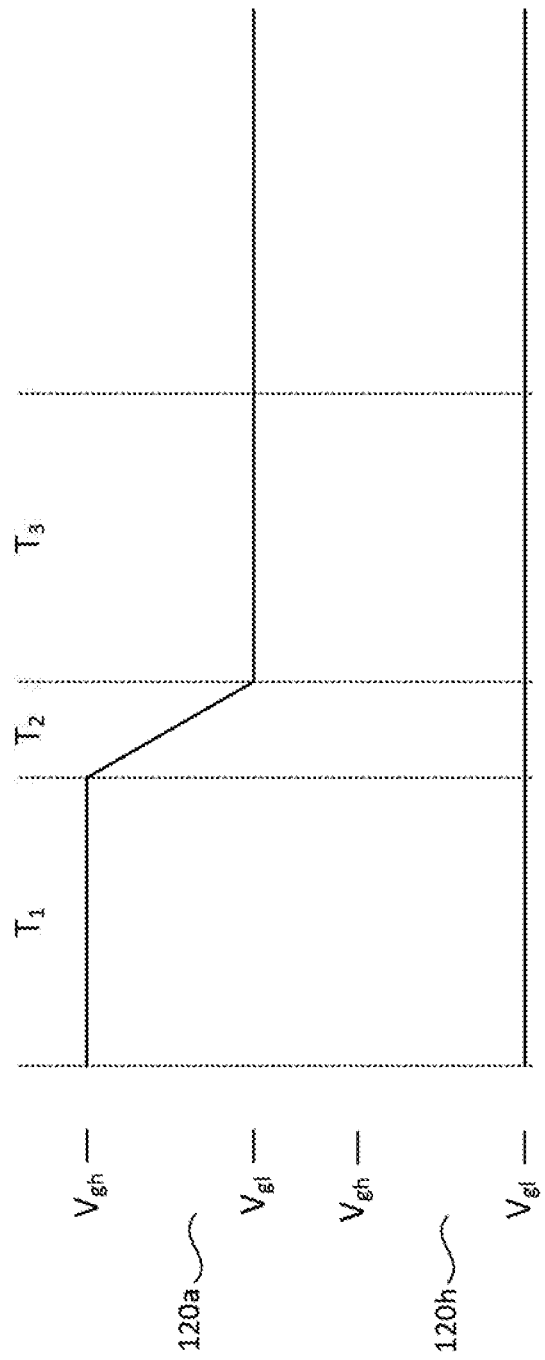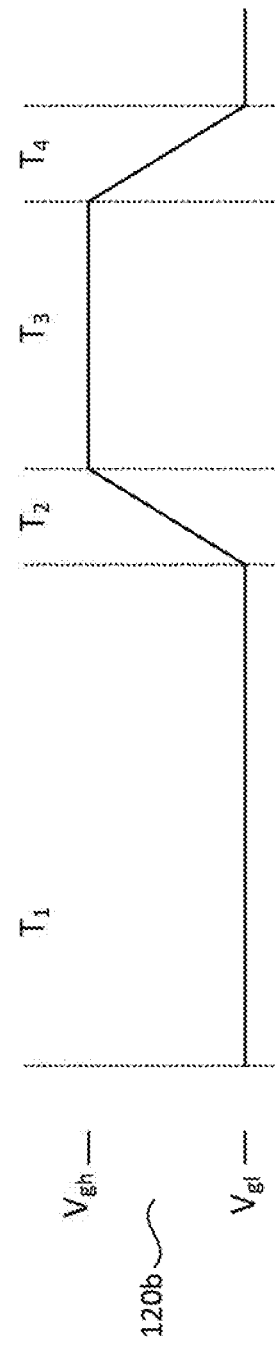

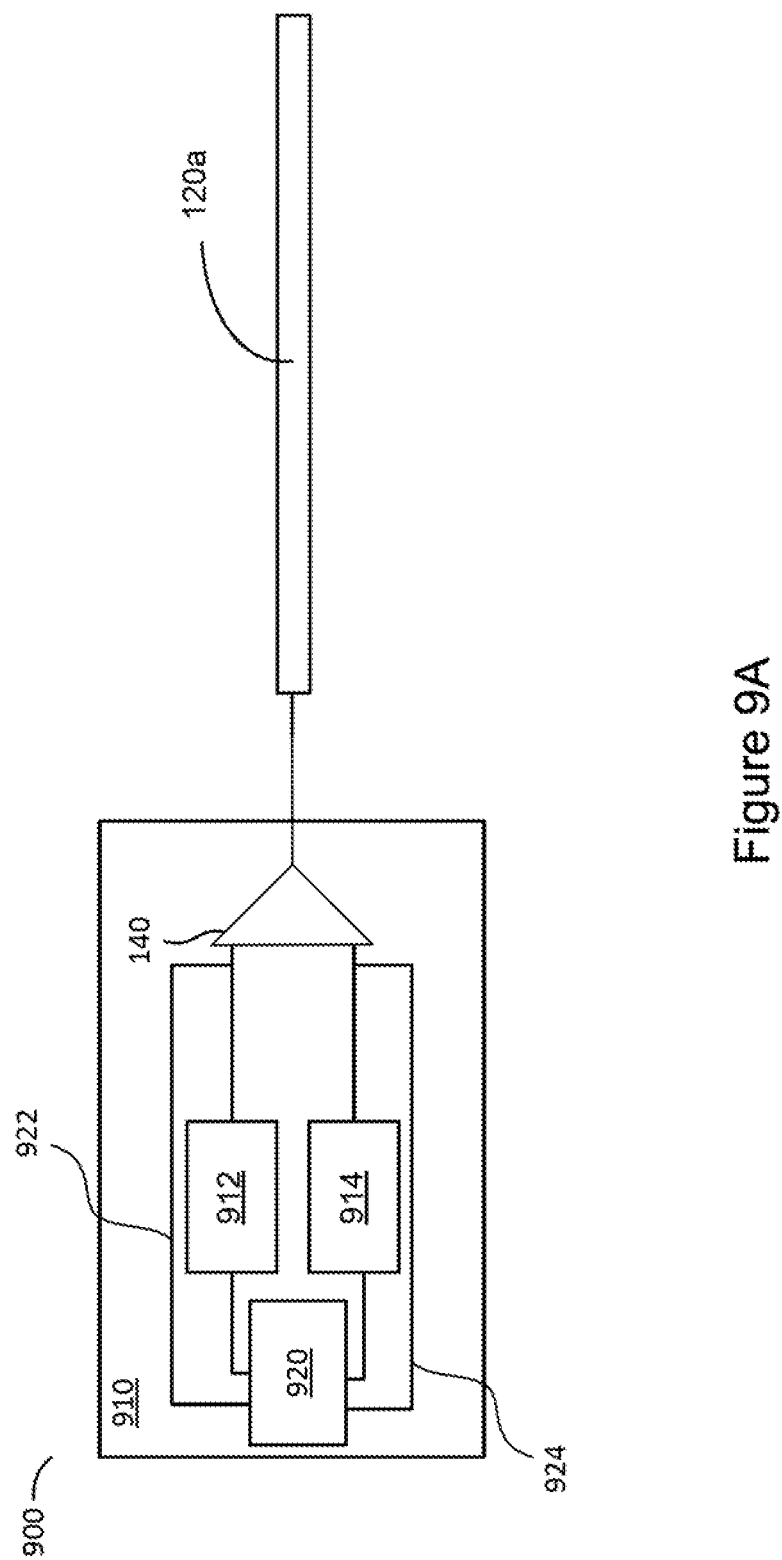

DISPLAY DRIVER WITH REDUCED VOLTAGE DROOP

TECHNICAL FIELD

Embodiments of disclosure generally relate to electronic devices and, more particularly, to display drivers for display devices.

BACKGROUND

In display devices, gate select voltages are used to select and deselect gate lines and corresponding sub-pixels for updating. For example a high voltage ($V_{gh}$) may be used to select a gate line and corresponding sub-pixels for display updating while a low voltage ($V_{gl}$) may be used to deselect a gate line and corresponding sub-pixels for display updating. When $V_{gh}$ is driven onto a gate line, the transistors that couple each sub-pixel to the gate line are turned on, and signals driven onto source lines update each sub-pixel. Further, when $V_{gl}$ is driven onto a gate line, the transistors that couple each sub-pixel to the gate line are turned off, and signals driven onto the source lines do not affect the sub-pixels. However, as gate lines are switched between $V_{gh}$ and $V_{gl}$, to select and deselect the gate lines, the current draw varies, which may cause $V_{gh}$ and $V_{gl}$ to droop. The voltage droop may cause some gate lines to become deselected when they should be selected and other gate lines to be selected when they should be deselected. Thus, in many current implementations, an external storage capacitor is used as a buffer against potential voltage droop. However, the external storage capacitor increases cost and complexity of a display driver.

Hence, there is a need for a display driver that is able to provide $V_{gh}$ and $V_{gl}$ that does not experience significant voltage droop.

SUMMARY

In one embodiment, a display driver configured to update a display of a display device comprises a first charge pump configured to drive a first gate line of the display device with a first voltage during a first period, a second charge pump configured to transition the first gate line from the first voltage to a second voltage during a second period, a third charge pump configured to drive the first gate line with the second voltage during a third period, and a fourth charge pump configured to transition the first gate line from the second voltage to the first voltage during a fourth period, wherein the first period occurs before the second period, the second period occurs before the third period, and the third period occurs before the fourth period.

In one embodiment, a display device comprises a plurality of gate lines coupled to sub-pixels, and a display driver. The display driver is coupled to the plurality of gate lines and comprises a first charge pump configured to drive a first gate line of the display device with a first voltage during a first period, a second charge pump configured to transition the first gate line from the first voltage to a second voltage during a second period, a third charge pump configured to drive the first gate line with the second voltage during a third period, and a fourth charge pump configured to transition the first gate line from the second voltage to the first voltage during a fourth period, wherein the first period occurs before the second period, the second period occurs before the third period, and the third period occurs before the fourth period.

In one embodiment, a method for updating a display device comprises coupling a first gate line of the display device with a first charge pump during a first period and driving the first gate line with a first voltage, coupling the first gate line with a fourth charge pump during a second period to transition the first gate line from the first voltage to a second voltage, coupling the first gate line with a third charge pump during a third period and driving the first gate line with the second voltage, and coupling the first gate line with a second charge pump during a fourth period to transition the first gate line from the second voltage to the first voltage, wherein the first period occurs before the second period, the second period occurs before the third period, and the third period occurs before the fourth period.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

FIGS. 5 and 6 illustrate voltage drive timings according to one or more embodiments.

FIGS. 9A, 9B, 9C, and 9D illustrate block diagrams of an exemplary display driver device, according to one or more embodiments.

Figure 1:
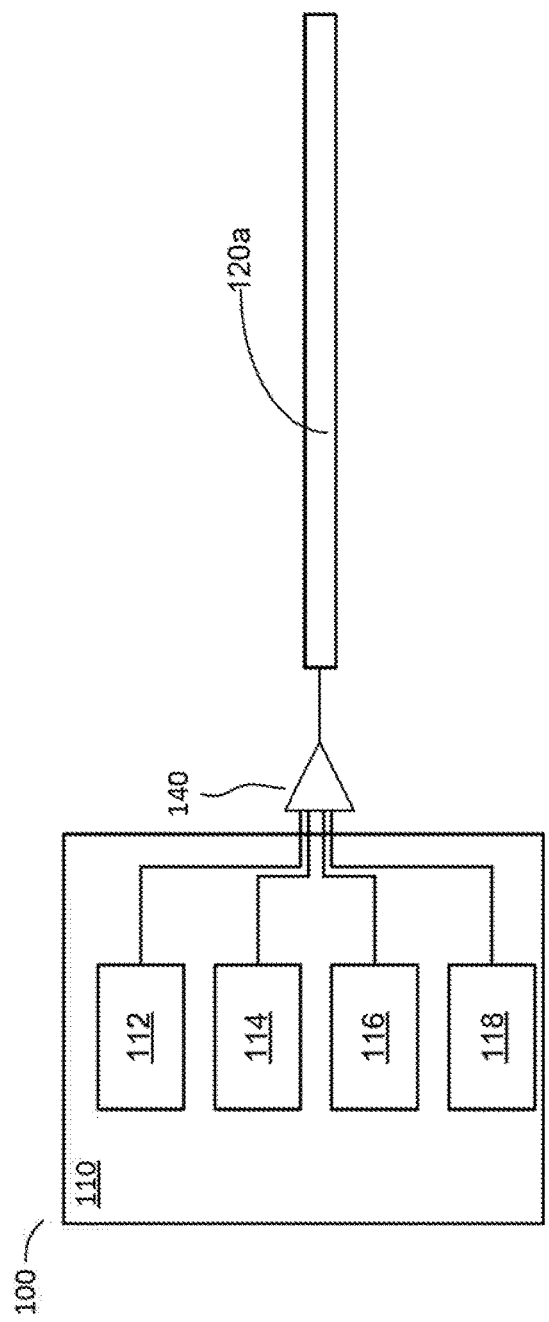
FIG. 1 is a block diagram of an exemplary display device, according to one or more embodiments.

To facilitate understanding, identical reference numerals have been used, where possible, to designate identical elements that are common to the Figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

In one or more embodiments, charge pumps of a display driver generate gate select voltages, $V_{gh}$ and $V_{gl}$, which are driven onto gate lines of the display device to select and deselect gate lines, and corresponding sub-pixels for updating. However, as gate lines are switched between $V_{gh}$ and $V_{gl}$ for selecting and deselecting the gate lines, errors may be introduced within the charge pumps. For example, the output of the charge pumps may experience voltage droop, which may negatively affect $V_{gh}$ and $V_{gl}$. In various embodiments, a display driver may be utilized multiple charge pumps, such that charge pumps that are used to sustain gate lines at either $V_{gh}$ and $V_{gl}$ are separate from charge pumps that are used to transition gate lines between $V_{gh}$ and $V_{gl}$. Thus, the charge pumps used to sustain the voltage on the gate lines are protected from any errors introduced by transitioning between $V_{gh}$ and $V_{gl}$. In other instances, the charge pumps may be regulated, limiting the output current of the charge pumps that may be introduced when transitioning between $V_{gh}$ and $V_{gl}$ and, thereby, limiting voltage droop.

FIG. 1 illustrates a display device 100 include display driver 110 configured to drive a gate line 120a. Display driver 110 includes charge pumps 112, 114, 116 and 118 each of which are configured to drive gate line 120a with a respective voltage. Further, while display device 100 is illustrated as having a single gate line 120a, in one or more embodiments, display device 100 includes a plurality of gate lines. In various embodiments, display device 100 additionally includes output driver 140 configured to selectively couple gate line 120a with a selected one of the outputs of charge pumps 112, 114, 116 and 118.

Charge pumps 112, 114, 116 and 118 are configured to drive voltages onto the gate lines of display driver 110 to select and deselect sub-pixels of a corresponding display line for updating. For example, charge pump 112 may be configured to drive gate line 120a with a high gate voltage ($V_{gh}$) that selects the sub-pixels of a corresponding display line for updating and charge pump 116 may be configured to drive gate line 120a with a low gate voltage ($V_{gl}$) to deselect the sub-pixels of the display line for updating. While not illustrated the output of the charge pumps may be coupled to one or more capacitors within display driver 110.

The sub-pixel electrode of each sub-pixel of the display device 100 is coupled to a gate line and a source line. When a gate line is selected, the electrodes of each sub-pixel coupled to that gate line may be updated by a corresponding source line, updating the display device. For example, the source lines drive a source voltage onto each of the sub-pixel electrodes to update the corresponding sub-pixels. In various embodiments, the gate lines are scanned for selecting and deselecting each gate line and corresponding sub-pixel for updating. In one embodiment, the gate lines are scanned in a sequentially from the top of the display to the bottom of the display, or from the bottom of the display to the top. In another embodiment, the gate lines may be scanned in a non-sequential order and may start or stop from any portion of the display.

Display device 100 additionally includes a common voltage electrode and a liquid crystal material (not shown). The voltage difference between the electrode of the sub-pixel and the common voltage electrode determines the amount of light that is transmitted through the liquid crystal material, and correspondingly, the brightness of the sub-pixel.

Each charge pump 112, 114, 116 and 118 is configured to drive gate line 120a during different periods with different voltages to select and deselect the gate line 120a. For example, charge pump 112 drives gate line 120a with a first voltage during a first period, charge pump 114 transitions gate line 120a from the first voltage to a second voltage during a second period, charge pump 116 is configured to drive gate line 120a with the second voltage during a third period, and charge pump 118 is configured to transfer gate line 120a from the second voltage to the first voltage during a period. In one embodiment, the first voltage is $V_{gh}$ and the second voltage is $V_{gl}$.

Charge pumps 112 and 116 may be referred to as sustain charge pumps as they are configured to maintain a gate line (e.g., gate line 120a) at a substantially constant voltage. In various embodiments, charge pumps 112 and 116 drive gate lines when the voltage on the gate lines is not transitioning. Charge pumps 114 and 118 may be referred to as drive charge pumps as they are configured to drive (or transition) gate lines from a first voltage (e.g., $V_{gh}$ or $V_{gl}$) to a second voltage (e.g., $V_{gl}$ or $V_{gh}$).

As charge pumps 112 and 116 do not need to transition voltages on the gate lines, the output of charge pumps 112 and 116 may be more accurate and have lower noise than that of charge pumps 114 and 118. Further, charge pumps 112 and 116 provide a lower current output as compared to that of charge pumps 114 and 118 as charge pumps 114 and 116 have to output enough current to meet transition time parameters when transitioning gate lines between $V_{gh}$ and $V_{gl}$. Further, the capacitance values of the charge pumps 114 and 118 may be higher than that of charge pumps 112 and 116. For example, charge pumps 114 and 118 may use larger capacitors than that of charge pumps 112 and 116.

As display driver 110 utilizes different charge pumps to sustain gate lines at either $V_{gh}$ and $V_{gl}$, and to transition gate lines between $V_{gh}$ and $V_{gl}$, the display driver 110 may be free of external capacitors (e.g., decoupling capacitors) used to store charge to prevent droop of either $V_{gh}$ and $V_{gl}$ when transitioning the gate lines.

Display drivers that employ only two charge pumps (e.g., a first charge pump to output $V_{gh}$ and a second charge pump to output $V_{gl}$), typically experience voltage droop (a temporary decrease in voltage level) when a gate line is switched between $V_{gh}$ and $V_{gl}$. Thus, such display drivers typically include external decoupling capacitors. In various implementations, when switching a gate line from $V_{gl}$ to $V_{gh}$, the capacitive load may be large enough to cause voltage droop. When the voltage droop is large enough, the gate selection circuitry may fail. Further, the voltage droop may cause gate lines that are currently deselected to become selected, and gate lines that are currently selected may become deselected. In either case, improper voltages may be applied to the sub-pixels, causing display errors. For example, the voltage droop may be about 5 to about 20 percent of the voltage change (e.g., the change from $V_{gl}$ to $V_{gh}$). The voltage droop may be about 5 volts to 10 volts.

Figure 2:
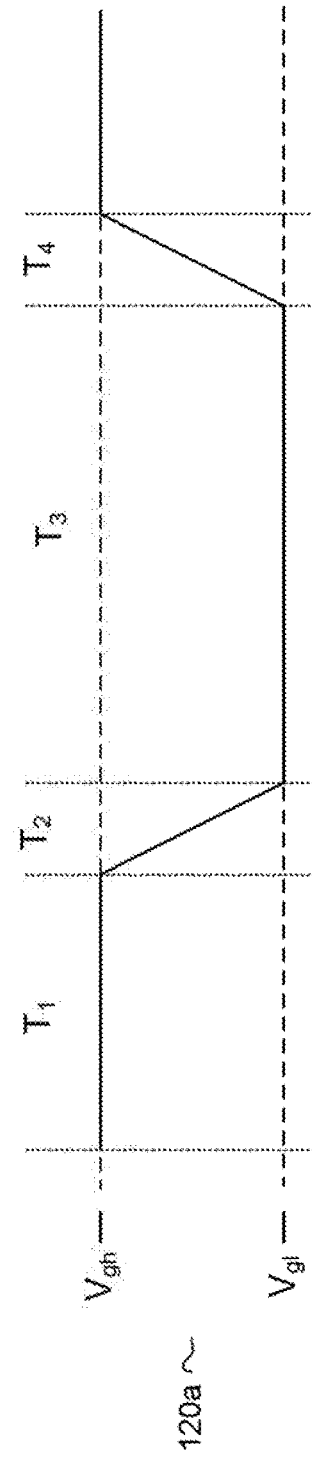
FIG. 2 illustrates voltage drive timing according to one or more embodiments.

FIG. 2 illustrates a time diagram of the voltages and transitions applied to gate line 120a in one example. During period $T_1$, $V_{gh}$ is driven onto gate line 120a by charge pump 112 to select gate line 120a for updating. During period $T_2$, the voltage on gate line 120a is transitioned from $V_{gh}$ to $V_{gl}$ by charge pump 114 to deselect gate line 120a. In one embodiment, when transitioning from $V_{gh}$ to $V_{gl}$, the voltage on gate line 120a may crash to 0 volts before being driven to the target voltage ($V_{gl}$) by charge pump 114. Period $T_2$ is shorter than period $T_1$. During period $T_3$, charge pump 115 maintains gate line 120a at $V_{gl}$ to ensure that gate line is maintained in a deselected state and the corresponding sub-pixels are not updated. Further, period $T_3$ is longer than period $T_1$. During period $T_4$ of FIG. 2, the voltage on gate line 120a is transitioned from $V_{gl}$ to $V_{gh}$ by charge pump 118 to select the sub-pixels coupled to gate line 120a for updating. Further, period $T_4$ is shorter than period $T_3$. In one embodiment, the voltage on gate line 120a may crash to 0 volts before being driven to the target voltage ($V_{gh}$) by charge pump 118.

In one embodiment, $V_{gh}$ may be a positive value and $V_{gl}$ may be a negative value. For example, $V_{gh}$ may be about 26 volts and $V_{gl}$ may be −10 volts. In other embodiments, other voltage levels may be used.

Figure 3:
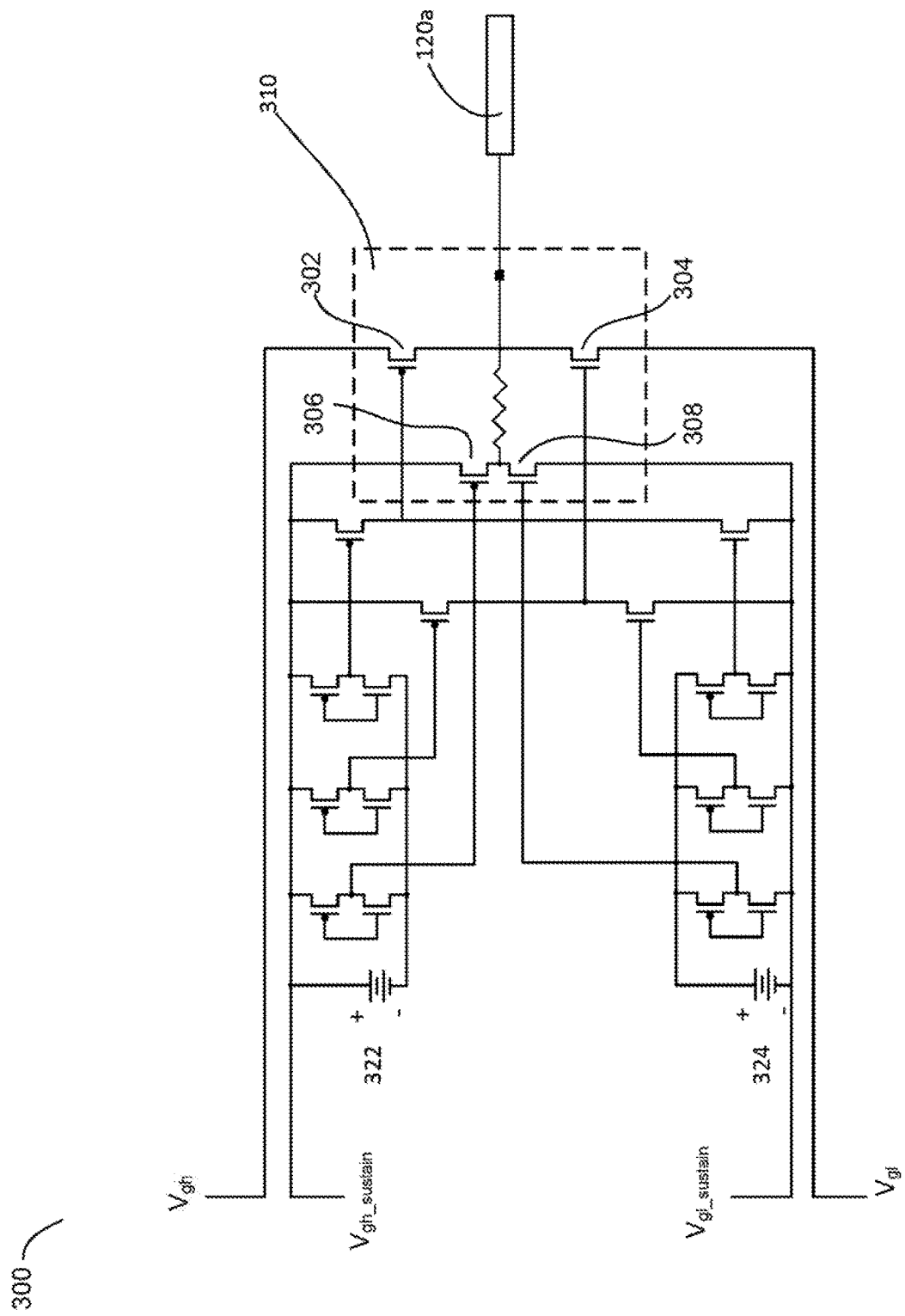
FIG. 3 illustrates an example charge pump according to one or more embodiments.

FIG. 3 illustrates an example output driver 300. FIG. 3 illustrates gate drive voltages $V_{gh}$ and $V_{gl}$ and gate sustain voltages $V_{gh}$ and $V_{gl}$ for selecting and deselecting the gate line 120a. The output driver 300 includes a final stage 310 which has output transistors 302 and 304. Output transistor 302 may be a PMOS transistor and is configured to drive $V_{gh}$ onto the gate line 120a. Further output transistor 304 may be a NMOS and is configured to drive $V_{gl}$ onto the gate line 120a. Output transistor 302 may be larger than output transistor 304. In one embodiment, output transistor 302 is twice as large as output transistor 304. For example output transistor 302 may be a 50 um PMOS transistor and output transistor 304 may be a 25 um NMOS transistor. In other embodiments, transistors of other sizes may be utilized.

Output transistor 302 may be driven by an inverter that is driven between $V_{gh}$ and Voltage 322. Further, output transistor 304 may be driven by an inventor that is driven between $V_{gl}$ and Voltage 324. In one embodiment, the inventors configured to drive the output transistors 302 and 304 may be low voltage inverters.

Transistors 306 and 308 may be referred to as sustain transistors as they are configured to sustain the voltage on an already driven gate line (e.g., gate line 120a). Contrary, output transistors 302 and 304 drive gate line 120a between $V_{gh}$ and $V_{gl}$. Further, as compared to output transistors 302 and 304, sustain transistors 306 and 308 need to be driven with less current. In one embodiment, the sustain transistor 306 may be configured to drive $V_{gh\_sustain}$ after output transistor 302 has driven gate line 120a with $V_{gh}$. Further, the sustain transistor 308 may be configured to drive $V_{gl\_sustain}$ after output transistor 304 has driven gate line 120a with $V_{gl}$. In one embodiment, output transistors 302 and 304 are configured to swing between $V_{gh}$ and $V_{gl}$ such that they are completely turned on. Further, the sustain transistors 306 and 308 may be configured to have a voltage swing in the amount of voltages 322 and 324, which is smaller than voltage difference between $V_{gh}$ and $V_{gl}$. For example, voltages 322 and 324 may be about 6 volts while $V_{gh}$ may be about 15 volts and $V_{gl}$ may be about −10 volts. Further, as sustain transistors 306 and 308 are only configured to maintain a voltage on the gate line 120a, they do not need to output as much current as output transistors 302 and 304, and a smaller voltage swing is permissible.

Figure 4A:
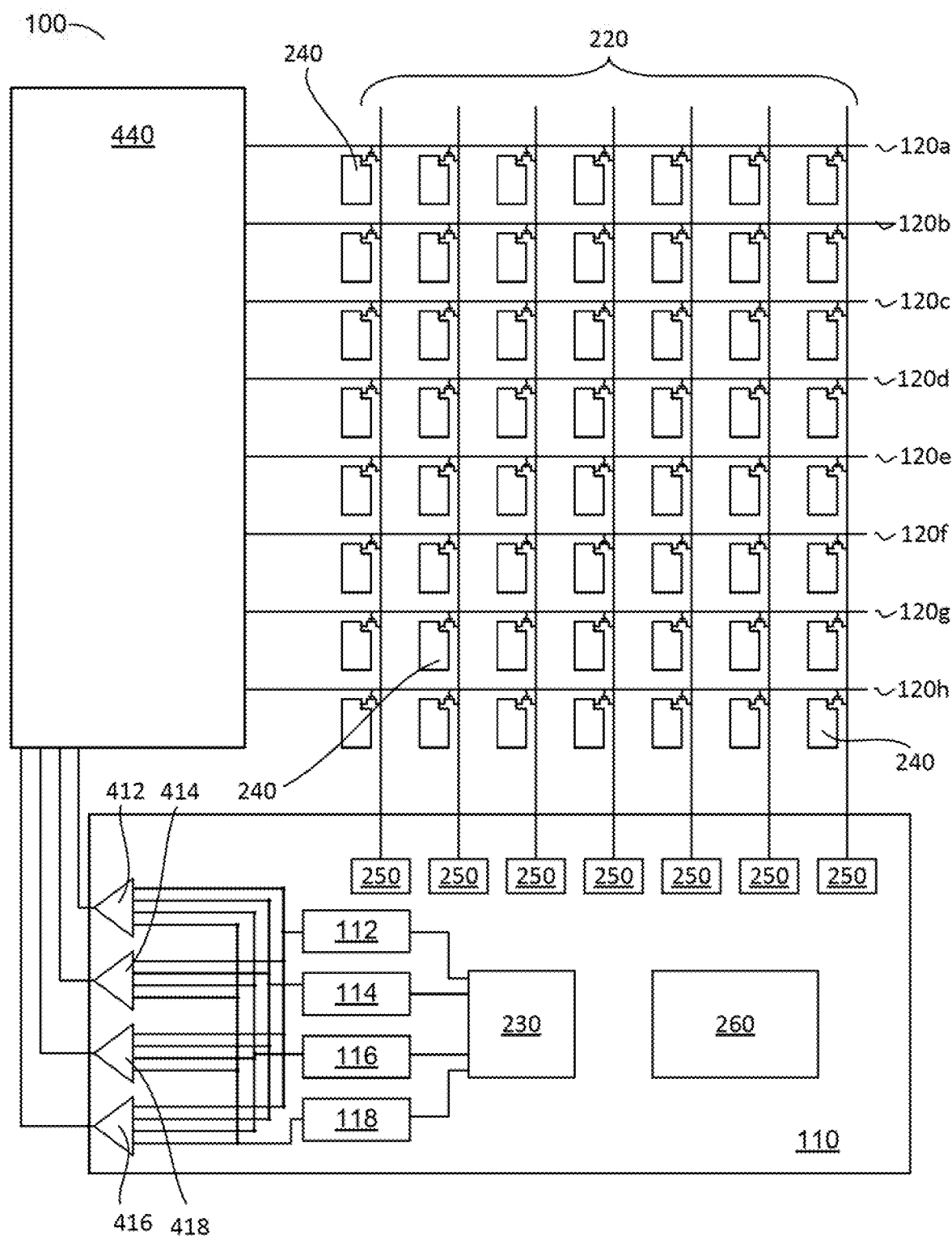
FIG. 4A is a block diagram of an exemplary display device, according to one or more embodiments.

FIG. 4a illustrates an alternative embodiment of display device 100. As is illustrated in FIG. 4a, display device 100 includes display driver 110, gate lines 120, source lines 220, selection circuitry 440 and sub-pixels 240.

Selection circuitry 440 is configured to select an output of one of charge pumps 112-118 via output drivers 412, 414, 416, and 418 to be applied to a corresponding gate line 120. Selection circuitry 440 may be multi-phase; such the output each output driver 412, 414, 416 and 418 may be driven onto different ones of the gate lines 120. In one embodiment, charge pump 112 and 118 output $V_{gh}$, charge pumps 114 and 116 output $V_{gl}$. The output drivers 412, 414, 416, and 418 are configured to selectively output the voltages provided by charge pumps 112, 114, 116, 118 to selection circuitry 440.

In one embodiment, during a first period, selection circuitry 440 selectively couples the output of output driver 412 to gate line 120a to transition the voltage on gate line 120a from $V_{gh}$ to $V_{gl}$, deselecting gate line 120a and corresponding sub-pixels from display updating. Further, selection circuitry 440 selectively couples the output of output driver 414 to gate line 120b with $V_{gh}$, driving the gate line 120b with $V_{gh}$ while the sub-pixels 240 corresponding to gate line 120b are updated by source lines 220. Additionally, during the first period, selection circuitry 140 selectively couples the output of output driver 418 to gate line 120c to transition the voltage on gate line 120b from $V_{gl}$ to $V_{gh}$, selecting gate line 120b and corresponding sub-pixels for display updating. Selection circuitry 140 is further configured to couple gate lines 120d-120h with the output of output driver 416, driving the gate lines 120d-120h with $V_{gl}$, during the first period.

Selection circuitry 140 may be included within display driver 110 or be separate from display driver 110. In one embodiment, the selection circuitry may be disposed on substrate of display device 100. Further, in one or more embodiments, the selection circuitry 140 may be disposed as part of or be separate from gate in panel (GIP) circuitry (not shown).

Further, while four separate output drivers are shown in the embodiment of FIG. 4a, in other embodiments, more or less than four output drivers may be utilized. For example, in some embodiments, 8 or more output drivers may be utilized. In one embodiment, a first output driver transitions the voltage on a gate line from $V_{gh}$ to $V_{gl}$, a second output driver transitions the voltage on a gate line from $V_{gl}$ to $V_{gh}$, and the remaining output drivers either sustain a gate line at $V_{gh}$ or $V_{gl}$.

Figure 4B:
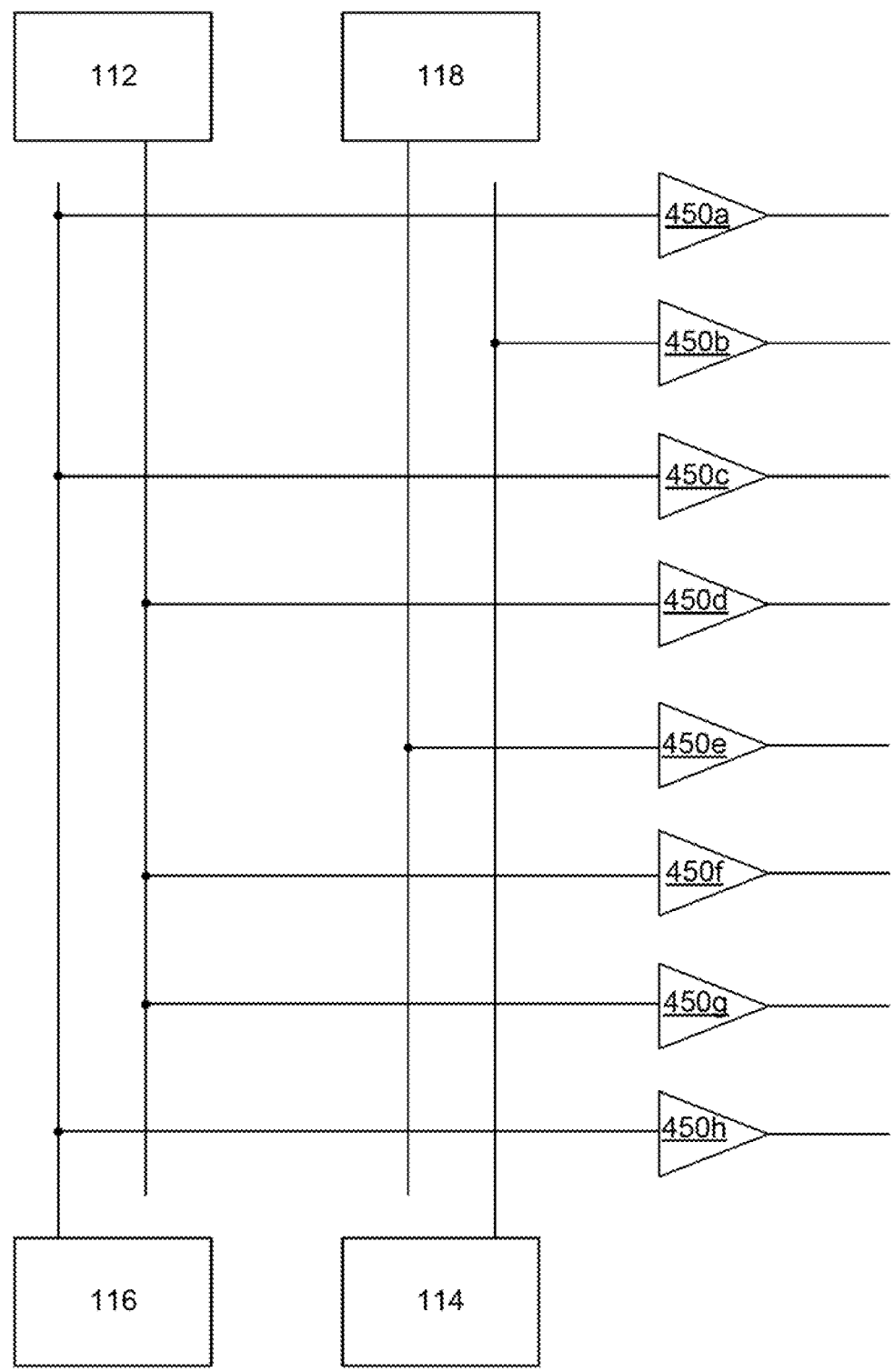
FIG. 4B is a block diagram of an example driver circuitry, according to one or more embodiments.

FIG. 4b an embodiment of display driver circuitry having more than 4 output drivers. In the embodiment of FIG. 4b, charge pumps 112, 114, 116, and 118 are coupled to output drivers 450a-450h. In the illustrated instance of FIG. 4b, output drivers 450a, 450c, and 450h are coupled to charge pump 116 and the output drivers 450a, 450c, and 450h output $V_{gl}$ that sustains gate lines coupled to the output drivers 450a, 450c, and 450h at $V_{gl}$. Further, output drivers 450d, 450f, and 450g are coupled to charge pump 112 and the output drivers 450d, 450f, and 450g output $V_{gh}$ that sustains gate lines coupled to the output drivers 450d, 450f, and 450g at $V_{gh}$. Output driver 450b is coupled to charge pump 114 and the output driver 450b is configured to transition a gate line coupled to the output driver 450b from $V_{gh}$ to $V_{gl}$. Further, output driver 4504 is coupled to charge pump 118 and the output driver 450e is configured to transition a gate line coupled to the output driver 450e from $V_{gl}$ to $V_{gh}$.

In the illustrated instance of FIG. 4b, output drivers 450a, 450c, and 450h are configured to sustain corresponding gate lines at $V_{gl}$, output drivers 450d, 450f, and 450g are configured to sustain corresponding gate lines at $V_{gh}$, output driver 450b, is configured to transition a corresponding gate line from $V_{gh}$ to $V_{gl}$, and output driver 450e is configured to transition a corresponding gate line from $V_{gl}$ to $V_{gh}$.

In one embodiment, the electrode of each sub-pixel 240 is coupled to a gate line 120 and source line 220 through a transistor. Driving a gate line with $V_{gh}$, "turns on" the corresponding transistors, selecting the sub-pixel for updating, and a voltage driven onto source lines 220 may be applied to the electrodes of the selected sub-pixels. Further, by driving the gate lines with $V_{gl}$, "turns off" the corresponding transistors, deselecting the corresponding sub-pixel for updating.

In one embodiment, one or more clock signals are provided to selection circuitry 140, and selection circuitry 140 couples each gate line with the output of a respective charge pump based on the clock signal. The clock signal may be a control signal provided by display driver 110.

In one embodiment, the selection circuitry 140 selects a respective gate line based on a timeout period. Further, in various embodiments, the duration of the timeout period may be selectively configured. For example, the duration of the timeout period may be increased or decreased by display driver 110. For example, selection circuitry 140 is configured to couple gate line 120*a* with the output of output driver 414 after gate line 120*a* is coupled with charge pump 112 for a period of time. Further, selection circuitry 140 is configured to couple gate line 120*a* with the output of output driver 418 after gate line 120*a* is coupled with output driver 416 for a second period of time. Selection circuitry 140 is further configured to couple gate line 120*a* with the output of charge pump 112 after gate line 120*a* is coupled with output driver 418 for a third period of time, and selection circuitry 140 is configured to couple gate line 120*a* with the output of output driver 416 after gate line 120*a* is coupled with output driver 414 for a fourth period of time. One or more of the first, second, third, and fourth period of times may be similar in length (e.g., duration), or at least one of the first, second, third, and fourth period of times may be different than another.

Selection circuitry 140 may be configured to drive multiple gate lines 120 simultaneously with the same voltage $V_{gh}$ or $V_{gl}$. For example, in various display devices, the transistors may require additional time to "turn on", as such, multiple gate lines may be simultaneously driven with $V_{gh}$ in a pipelining fashion. In one embodiment, gate line 120*a* may be driven by charge pump 112 with $V_{gh}$ during a first period, and gate lines 120*b* and 120*c* may be transitioned from $V_{gl}$ to $V_{gh}$ by charge pump 118 during a second and third period, respectively. In such an embodiment, the first period at least partially overlaps with the second period and the third period. In another embodiment, gate line 120*a* may be transitioned from $V_{gh}$ to $V_{gl}$ by charge pump 114 during a period of time that at least partially overlaps with when gate line 120*b* is driven with $V_{gh}$ by charge pump 112 and charge pump 118 transitions gate line 120*c* from $V_{gl}$ to $V_{gh}$.

In one embodiment, one gate line 120 is coupled to a single output driver. In another embodiment, multiple gate lines 120 are coupled to the same output driver. For example, each gate line 120 may be coupled to output driver 412 or 416 to drive each gate line with a common voltage after a display reset period.

Display driver 110 may additionally include power supply 230 configured to provide power supply signals to charge pumps 112-118. In various embodiments, power supply 230 may be at least partially external to display driver 110. Further, in one or more embodiments, display driver 110 includes source drivers 250 that are configured to provide source voltages (e.g., display data) to source lines 220.

Display driver 110 may be a controller disposed on a substrate of display device 100. In one embodiment, display driver 110 is communicatively with an external electronic system and is configured to receive display data from the electronic system. In one embodiment, the electronic system includes a timing controller that is communicatively coupled to the display driver 110 and is configured to transmit display data to the display driver 110. In another embodiment, the electronic system includes a host controller that is communicatively coupled to display driver 110 and is configured to communicate display data to the display driver. The display data may be used by source drivers 250 to update the subpixels.

In various embodiments, display driver 110 includes display driver module 260 configured to receive display data from the electronic system, process the display data and communicate the processed display data to source drivers 250 and/or power supply 230. The display driver 110 may include any combination of hardware and/or firmware. For example, the display driver module may be configured to provide clock signals, timing signals and/or other control signals utilized when driving display device 100 for updating.

In one or more embodiments, charge sharing techniques may be utilized between a gate line that is transitioning between $V_{gh}$ and $V_{gl}$ and a gate line that is transitioning between $V_{gl}$ and $V_{gh}$. For example, a first gate line that is transitioning between $V_{gh}$ and $V_{gl}$ may be coupled with a gate line that is transitioning between $V_{gl}$ and $V_{gh}$ to permit the charge to move between the gate lines before each gate line is fully transitioned to $V_{gl}$ or $V_{gh}$, respectively. In various embodiments, the amount of time that the gate lines are coupled together may vary, and may be determined by display driver 110.

FIG. 5 is a timing diagram illustrating voltages that are driven onto gate lines 120*a* and 120*h*. As illustrated, gate line 120*a* is driven with $V_{gh}$ during period $T_1$ by output driver 412, gate line 120*a* is transitioned from $V_{gh}$ to $V_{gl}$ during period $T_2$ by output driver 414, and gate line 120*a* is driven with $V_{gl}$ during periods $T_3$ by output driver 416. Further, during periods $T_1$, $T_2$ and $T_3$, gate line 120C is driven with $V_{gl}$ by output driver 416.

FIG. 6 is a timing diagram illustrating voltages that are driven onto gate line 120*b*. During period $T_1$, gate line 120*b* is driven with $V_{gl}$ by output driver 416, during period $T_2$, gate line 120*b* is transitioned from $V_{gl}$ to $V_{gh}$ by output driver 418. Further, during period $T_3$, gate line 120*b* is driven with $V_{gh}$ by output driver 412 and, during period $T_4$, gate line 120*b* is transitioned from $V_{gh}$ to $V_{gl}$ by output driver 414. Stated another way, during period $T_1$, gate line 120*b* is not selected for updating, and during period $T_3$, gate line 120*b* is selected for updating.

In one or more embodiments, period $T_1$ of FIG. 2 overlaps with period $T_1$ of FIG. 6, period $T_2$ of FIG. 2 overlaps with period $T_2$ of FIG. 6, period $T_3$ of FIG. 2 overlaps with period $T_3$ of FIG. 6, and period $T_4$ of FIG. 2 overlaps with period $T_4$ of FIG. 6.

Figure 7:
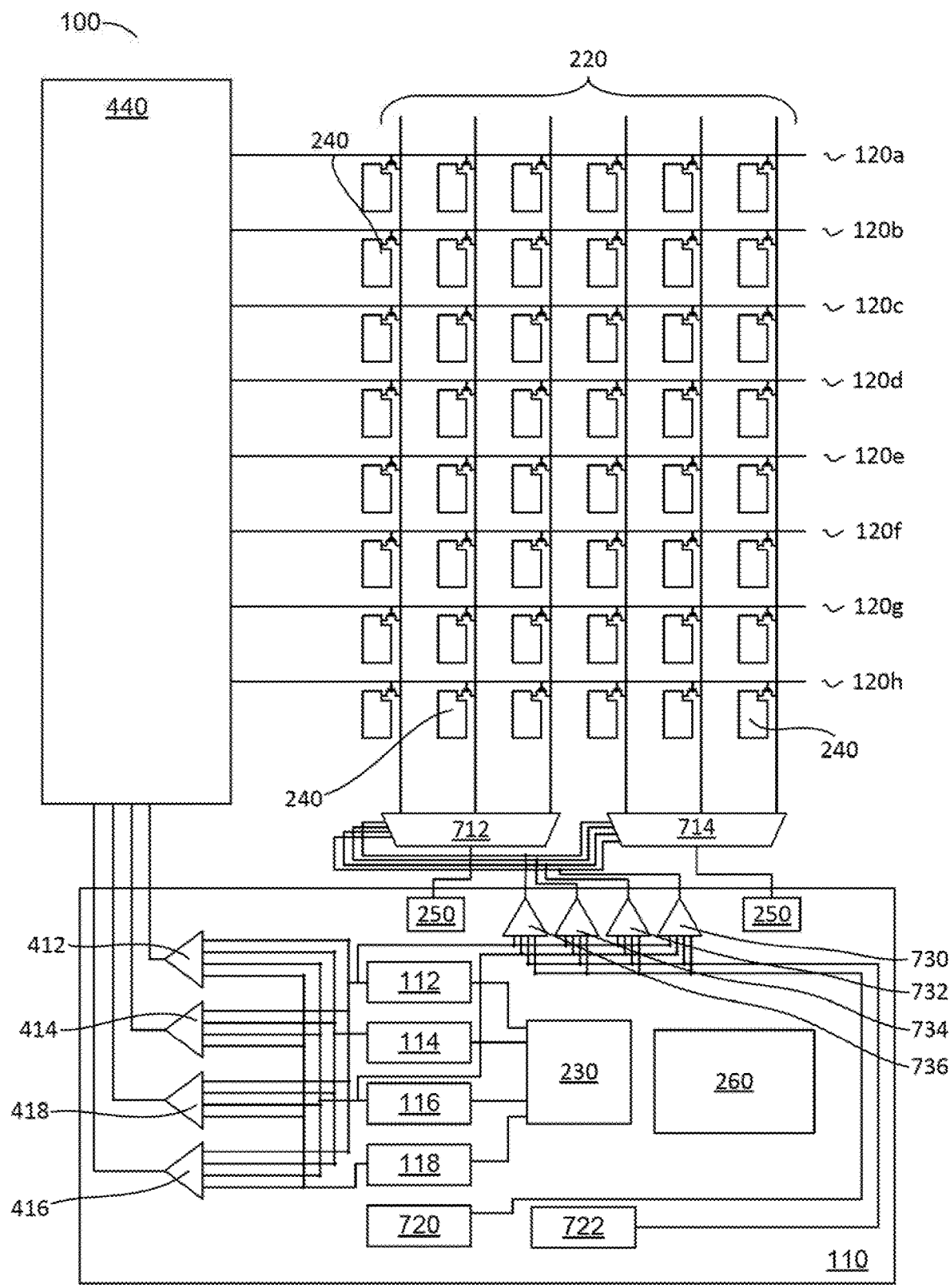
FIG. 7 is a block diagram of an exemplary display device, according to one or more embodiments.

FIG. 7 illustrates an alternative embodiment of display device 100. As compared to the display device of FIG. 4, the display device of FIG. 7 includes multiplexers 712 and 714 coupling source drivers 250 with source lines 220. Each multiplexer 712 and 714 couples a group of source lines with each source driver 250. In one embodiment, multiplexer 712 couples a first source line with a first source driver 250 during a first period, a second source line with the first source driver 250 during a second period and a third source line with the first source driver 250 during a third period. The embodiment of FIG. 7 additional includes charge pumps 720, 722 and output drivers 730, 732, 734, and 736. Each multiplexer 712 and 714 receives the outputs of output driver 730, 732, 734, and 736 and utilizes those outputs to select and deselect source lines for updating. For example, $V_{gh}$ may be used to select a source line for updating and $V_{gl}$ may be used to deselect a source line for updating.

In one embodiment, a first source line of source lines 220 is coupled to an output of output driver 730 during a first period to drive the first source line with $V_{gh}$, while the first source line is selected for updating by a source driver. During a second period, the first source line is coupled to the output of output driver 732 to transition the first source lines from $V_{gh}$ to $V_{gl}$, deselecting the source line. During a third period the first source line is coupled to the output of output driver 734 to drive the first source line with $V_{gl}$ while the first source line is deselected. During a fourth period, the first source line is coupled with the output of output driver 736 to transition the first source line from $V_{gl}$ to $V_{gh}$, selecting the first source line for updating. In various embodiments, source lines that are coupled to different multiplexers may be simultaneously driven for display updating by corresponding source drivers.

Source drivers 250 drive display voltages onto corresponding source lines to update selected subpixels. In various embodiments, the display voltages are based on display data provided by an electronic system. The voltages on the electrodes of the subpixels create a voltage difference between the subpixel electrodes and a common voltage electrode or electrodes, varying a property of the liquid crystal material and controlling the brightness of each subpixel.

Figure 8:
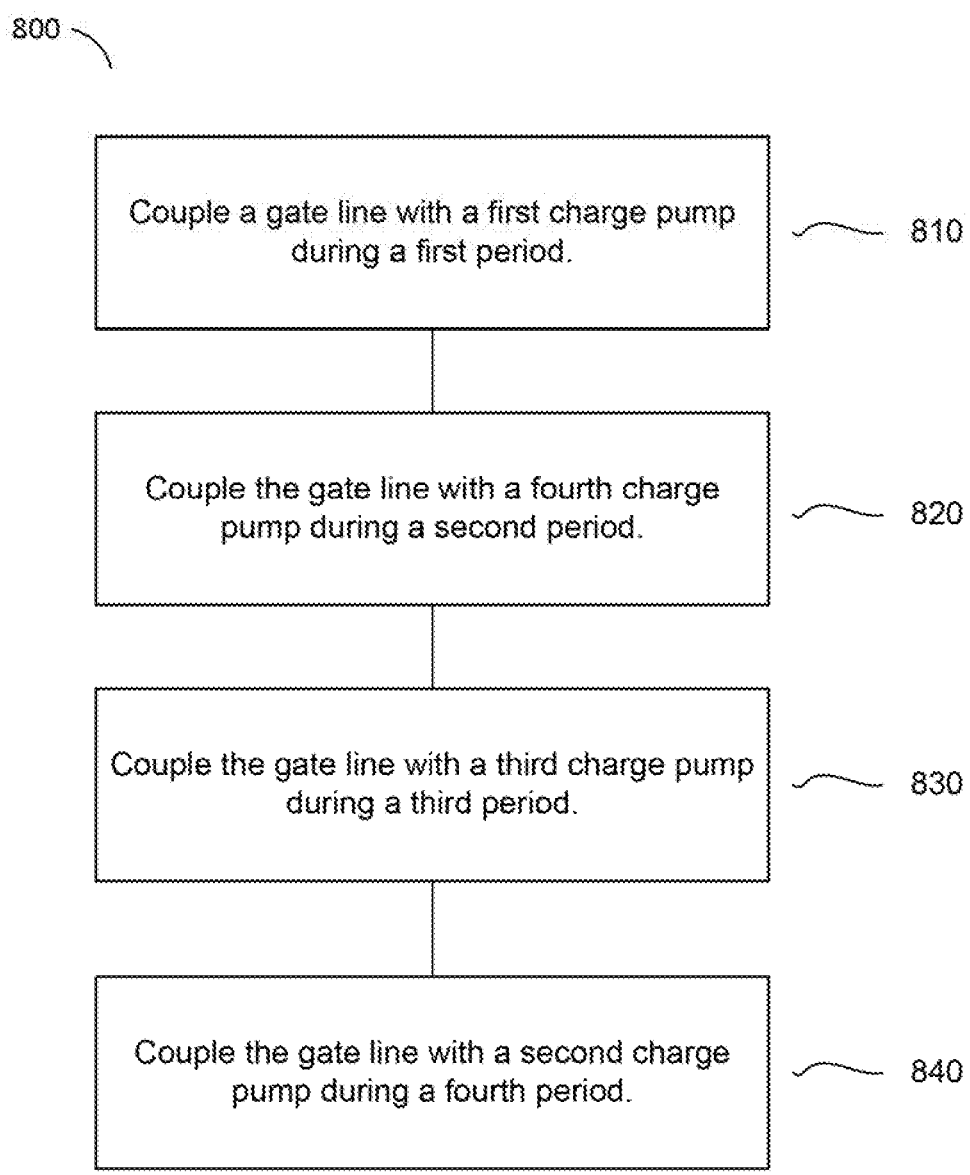
FIG. 8 illustrates a method for driving a gate line, according to one or more embodiments.

FIG. 8 illustrates a method 800 for avoiding voltage droop while driving gate lines of a display device. At step 810 of the method 800, a first gate line is coupled to a first charge pump via a first output driver during a first period. For example, gate line 120a may be coupled with charge pump 112 during a first period to drive gate line 120a with $V_{gh}$. In one embodiment, subpixels coupled to gate line 120a are updated during the first period. Further, a control signal, such as a clock signal, may be provided to selection circuitry 140 to couple gate line 120a with the output of charge pump 112. At step 820, the first gate line is coupled with a second charge pump via a second output driver during a second period to transition gate line 120a from a first voltage to a second voltage. For example, gate line 120a is coupled with charge pump 114 during a second period to transition gate line 120a from $V_{gh}$ to $V_{gl}$. In one embodiment, transitioning gate line 120a from $V_{gh}$ to $V_{gl}$ deselects gate line 120a and corresponding subpixels from display updating. Further, a control signal, such as a clock signal, may be provided to selection circuitry 140 to couple gate line 120a with the output of charge pump 114.

At step 830 of method 800, the first gate line is coupled with a third charge pump via a third output driver during a third period. For example, gate line 120a may be coupled with charge pump 116 to drive the gate line with $V_{gl}$ during a third period. Further, driving gate line 120a with $V_{gl}$ sustains the gate line 120a and corresponding sub-pixels in a deselect state. Moreover, a control signal, such as a clock signal, may be provided to selection circuitry 140 to couple gate line 120a with the output of charge pump 116. At step 840 of method 800, gate line 120a is coupled with a fourth charge pump via a fourth output driver to transition gate line 120a from $V_{gl}$ to $V_{gh}$, selecting gate line 120a and the corresponding subpixels for display updating. Further, a control signal, such as a clock signal, may be provided to selection circuitry 140 to couple gate line 120a with the output of charge pump 118.

FIG. 9a illustrates a display device 900 having display driver 910 configured to drive gate line 120a. Display driver 910 includes charge pump 912 and charge pump 914. In one or more embodiments, the output driver 140 coupled to the one or more of charge pumps 912 and 914 is current limited. In one embodiment, the output current capability of charge pump 912 and/or charge pump 914 is greater than the maximum current that may be expected to be driven onto gate line 120a by the output driver 140. Thus, the voltage on the gate lines may remain at about $V_{gh}$ and $V_{gl}$, respectively, when one or more other gate lines are switched between $V_{gh}$ and $V_{gl}$. Further, in various embodiments, power supply 920 may be configured the limit the current of charge pump 912 and/or charge pump 914.

Figure 9B:
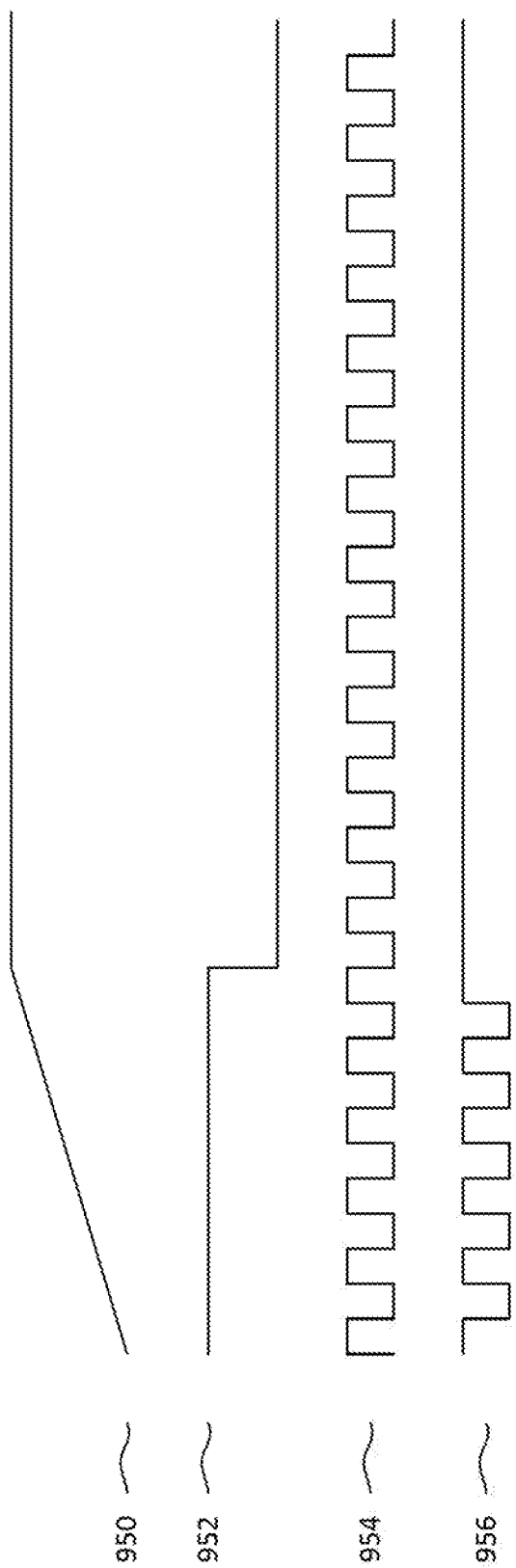

Power supply 920 may be a pulse skipping power supply that is configured to limit the current of charge pumps 912 and/or 914. FIG. 9b is a diagram of the output signals and control signals used to operate a pulse skipping power supply. Gate line voltage 950 is the voltage output onto a gate line (e.g., gate line 120a). Signal 952 is a feedback signal that remains high while the gate line voltage 950 is below a threshold level (e.g., Ref). For example, below $V_{gh}$ or above $V_{gl}$. Further, clock signal 954 is a clock signal used by a pulse skipping power supply to output charge. In embodiment, a pulse skipping power supply may be configured to output charge onto a gate line on each rising edge of clock signal 954. However, once the gate line voltage 950 has reached the threshold level, the rising edges of the clock signal 954 may be ignored such that the gate line is not over driven. Clock signal 956 identifies the portions of the clock signal 954 that may be ignored. In embodiments where voltage droop may occur, such that the voltage on the gate line drops below $V_{gh}$ or $V_{gl}$, more charge is needed to be driven onto the gate line to ensure that the gate line remains activated or deactivated.

In one embodiment, a feedback loop may be used to measure gate line voltage 950 and when the gate line voltage 950 drops below a threshold, signal 952 goes high and clock signal 956 goes low such that the pulse skipping power supply may be configured to drive charge onto the gate line until voltage 950 satisfies the threshold voltage. An example feedback circuit is illustrated in FIG. 9a and a more detailed version of the feedback circuit can be found in the embodiment of FIG. 9c. Feedback loops 922 and 924 may be utilized to measure the voltage on gate line 120a. In one embodiment feedback loop 922 may be utilized when $V_{gh}$ is driven on gate line 120a and feedback loop 924 may be utilized when $V_{gl}$ is driven on gate line 120a. In other embodiments, only a single feedback loop may be used.

Figure 9C:
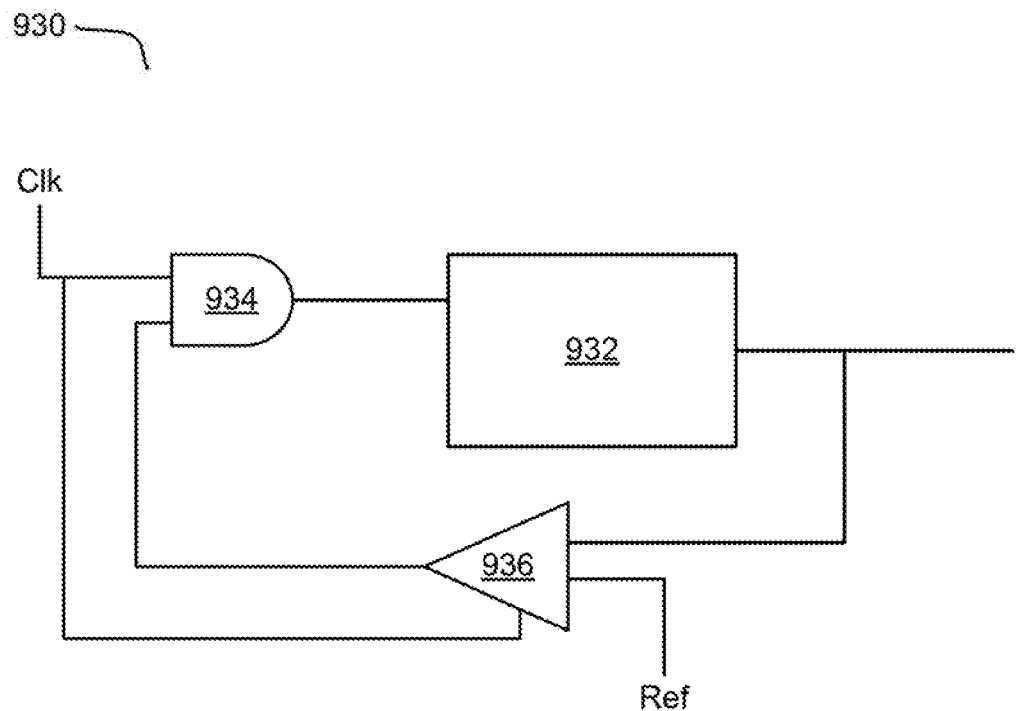

FIG. 9c illustrates an example feedback circuit 930 that may be used to determine the state of signal 952. In one embodiment, feedback circuit 930 includes a comparator 936 and logic 934 coupled to the output of charge pump 932. In other embodiments, charge pump 932 may be any one of charge pumps 112, 114, 116, 118, 912 or 914. The output of charge pump 932 is compared by comparator 936 to a reference voltage (Ref). Ref may be a voltage based on $V_{gh}$ or $V_{gl}$. In one embodiment, Ref is a percentage of $V_{gh}$ or $V_{gl}$. In other embodiments, both the output of charge pump 932 and the Ref voltage may be a divided voltage, such that Ref is about half of $V_{gh}$ or $V_{gl}$. When the output of charge pump 932 is substantially the same or greater than Ref, Clk signal is not sent to charge pump 932, and charge pump 932 does not provide additional charge to be driven by an output driver. Contrary, when the output of charge pump 932 is less than Ref, the Clk signal is allowed to be driven onto charge pump 932 such that charge pump 932 outputs additional charge until the output voltage satisfies Ref.

In embodiments, where charge pump 932 is configured to provide $V_{gh}$, Ref is based on $V_{gh}$. In embodiments, where charge pump 932 is configured to provide $V_{gl}$, Ref is based on $V_{gl}$.

Further, power supply 920 may be configured to limit the drive current of charge pumps 912 and/or 914. For example, by varying the rate at which power supply 920 provides charge to charge pumps 912/914, the output current to the charge pumps may be controlled. For example, when more current is needed, the frequency at which power supply 920 provides charge to charge pumps 912/914 may be increased.

In other embodiments, charge pumps 912 and/or 914 may be programmable. For example, the switching rate of charge pump 912 and/or 914 may be increased when voltage droop may be present and decreased down when voltage droop is not determined to present. Display driver 910 is configured to detect voltage droop by detecting an increase in output capacitance, detecting an increase in the capacitance of the charge pump, or detect a change of either $V_{gh}$ or $V_{gl}$.

In various embodiments, the output driver of each charge pump 912, 914 includes one or more transistors configured to limit the current of the charge pumps. In other embodiments, one or more current mirrors ("fingers") may be turned on and off to limit the current of charge pumps 912, 914.

Figure 9D:
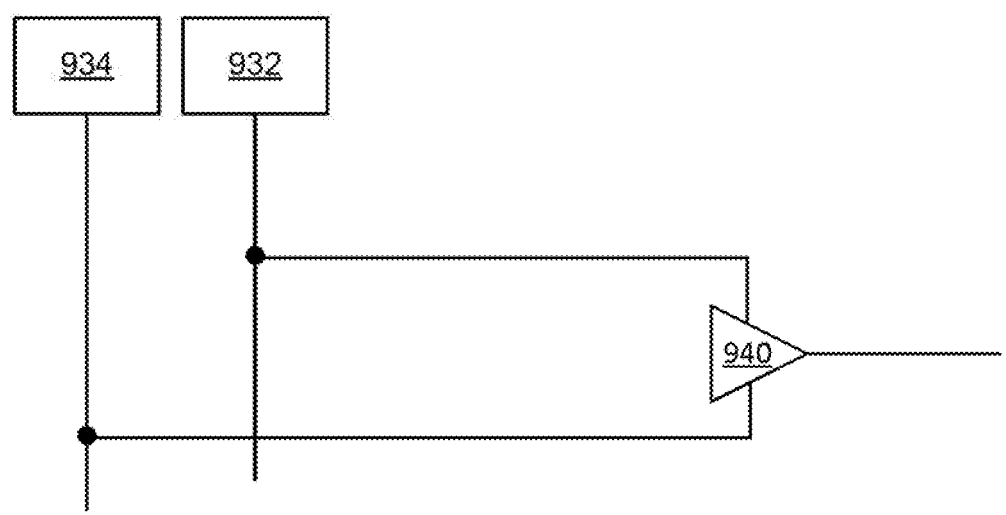

FIG. 9d illustrates an alternative embodiment of current limiting. In the illustrated embodiment, the output of the charge pumps 932 and 934 are coupled to output buffer 940. The output buffer 940 may be current limited. For example, the output buffer 940 may limit the current pulled by the output buffer 940 to be below the maximum current provided by the charge pumps 932 and 934. In one embodiment, the output buffer 940 have a current limit of 8 mA (e.g., maximum current output) and the charge pumps 932, 934 is able to output 10 mA. Limiting the current pulled by output driver 940 limits the amount of current the output drives are able to pull to be below the maximum current the charge pumps 932 and 934 are able to provide. Thus, voltage droop may be avoided. In one embodiment, current limit units may be disposed between each charge pump and the output drivers, where the current limit units may be configured to limit the amount of current provided to the output drivers. Each current limit unit may have the same current limit or one or more of the current limit units may have a different current limit than another current limit unit. The current limit for each current limit unit may correspond to the current output of the corresponding charge pump.

Figure 10:
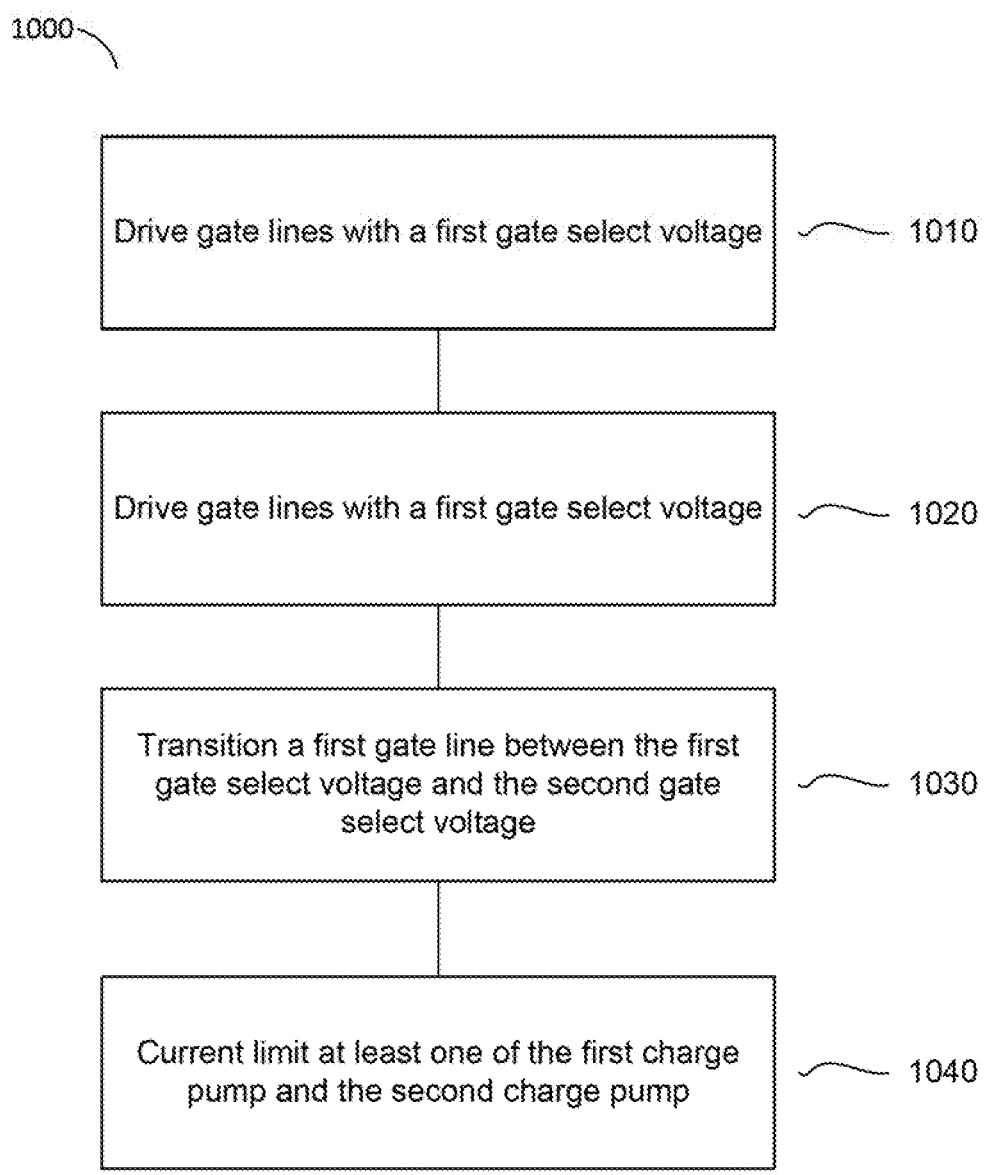
FIG. 10 illustrates a method for driving a gate line, according to one or more embodiments.

FIG. 10 illustrates a method 1000 for reducing voltage droop in gate select voltages. At step 1010 of the method 1000, a first charge pump drives gate lines with a first gate select signal. For example, charge pump 912 may be configured to drive one or more gate lines 120 with $V_{gh}$. At step 1020, a second charge pump drives the gate lines with a second gate select signal. For example, charge pump 912 may be configured to drive one or more gate lines 120 with a $V_{gl}$.

At step 1030, a first gate line is transitioned between the first gate select voltage and the second gate select voltage. For example, gate lines 120a may be transitioned from $V_{gh}$ to $V_{gl}$ or from $V_{gl}$ to $V_{gh}$. In other embodiments, one or more gate lines may be transitioned from $V_{gh}$ to $V_{gl}$ while one or more gate lines are transitioned from $V_{gl}$ to $V_{gh}$. At step 1040, the first charge pump and/or the second charge pump is current limited. For example, charge pump 912 and/or charge pump 914 may be current limited. In one embodiment, the output drivers of the charge pumps are current limited. Further, a power supply and/or an output buffer coupled to the charge pumps may be configured to limit the current of the charge pumps. In various embodiments, the charge pumps have a programmable switching rate which may be altered to limit the current output by the charge pumps.

In various embodiments, switching gate lines between gate select voltages alters the capacitance coupled to the charge pumps, which may lead to voltage droop. In one or more embodiments, a display driver may utilize drive gate lines transitioning between gate select voltages with a charge pump or pumps separate from those used to drive gate lines not transitioning between gate select voltages. Such embodiments ensure that noise which occurs in the charge pumps driving gate lines transitioning between gate select voltages does not negatively affect charge pumps driving gate lines with a constant gate select voltage. Further, in one or more embodiments, the current of the charge pumps may be limited to reduce the amount of and/or the effects of voltage droop. For example, the output drivers of the charge pumps are current limited.

In one or more embodiments, a display driver comprises a first charge pump is configured to drive gate lines with a first gate select voltage to select the gate lines with for display updating, and a second charge pump is configured to drive the gate lines with a second gate select voltage to deselect the gate lines for display updating. At least one output buffer coupled to the output of of the first charge pump and the second charge pump is current limited such that when a first gate line is transitioned from being driven by the first charge pump to being driven by the second charge pump, and the second gate select voltage is less than the first gate select voltage.

In an embodiment, the first charge pump and the second charge pump are coupled to a power supply, and the power supply is configured to limit a drive current provided to the first charge pump and the second charge pump.

In an embodiment, the power supply is pulse skipping power supply. In an embodiment, limiting the drive current comprises varying a rate that the power supply provides charge to the first charge pump and the second charge pump. In various embodiments, the first charge pump and the second charge pump are programmable.

In one or more embodiments, the first charge pump and the second charge pump include a switching rate, and wherein the switching rate may be altered to limit current output by the first charge pump and the second charge pump.

In an embodiment, the display driver is configured to: detect a change in one of the first gate select voltage and the second gate select voltage; and adjust one of the first gate select voltage and the second gate select voltage based on the detected change.

In other embodiment, the output of the charge pumps may be coupled to a current limit unit which is configured to limit the current of drawn by an output buffer to be below the maximum output current of the charge pumps.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. A display driver configured to update a display of a display device, the display driver comprising:
   a first charge pump configured to drive a first gate line of the display device with a first voltage during a first period;
   a second charge pump configured to transition the first gate line from the first voltage to a second voltage during a second period;
   a third charge pump configured to: drive the first gate line with the second voltage during a third period, and drive a second gate line of the display device with the second voltage during a fifth period; and a fourth charge pump configured to transition the first gate line from the second voltage to the first voltage during a fourth period, wherein the first period occurs before the second period, the second period occurs before the third period, the third period occurs before the fourth period, and the fourth period occurs before the fifth period.

2. The display driver of claim 1, wherein the first voltage is a gate select high voltage and the second voltage is a gate select low voltage.

3. The display driver of claim 1, wherein the first period is longer than the second period and the third period is longer than the fourth period.

4. The display driver of claim 1, wherein:
the fourth charge pump is further configured to transition the second gate line from the second voltage to the first voltage during a sixth period;
the first charge pump is further configured to drive the second gate line with the first voltage during a seventh period; and
the second charge pump is further configured to transition the second gate line from the first voltage to the second voltage during an eighth period, and wherein the fifth period occurs before the sixth period, the sixth period occurs before the seventh period and the seventh period occurs before the eighth period.

5. The display driver of claim 4, wherein the fifth period is longer than the sixth period and the seventh period is longer than the eighth period.

6. The display driver of claim 4, wherein the first period overlaps with the fifth period, the second period overlaps with the sixth period, the third period overlaps with the seventh period and the fourth period overlaps with the fifth period.

7. The display driver of claim 1, wherein the first charge pump, the second charge pump, the third charge pump and the third charge pump are further configured to drive source lines of the display device.

8. The display driver of claim 1, wherein the first charge pump is further configured to drive a third gate line of the display device with the first voltage during the first period, the second period, and the third period.

9. The display driver of claim 1, wherein the first charge pump is configured to output a lower current than the second charge pump, and the third charge pump is configured to output a lower current than the fourth charge pump.

10. The display driver of claim 1, the first charge pump, the second charge pump, the third charge pump and the fourth charge pump are configured to drive the first gate line based on a clock signal.

11. A display device comprising:
a plurality of gate lines coupled to sub-pixels; and
a display driver coupled to the plurality of gate lines, the display driver comprises:
a first charge pump configured to drive a first gate line of the display device with a first voltage during a first period;
a second charge pump configured to transition the first gate line from the first voltage to a second voltage during a second period;
a third charge pump configured to: drive the first gate line with the second voltage during a third period, and drive a second gate line of the display device with the second voltage during a fifth period; and
a fourth charge pump configured to transition the first gate line from the second voltage to the first voltage during a fourth period, wherein the first period occurs before the second period, the second period occurs before the third period, the third period occurs before the fourth period, and the fourth period occurs before the fifth period.

12. The display device of claim 11, wherein the first voltage is a gate high voltage and the second voltage is a gate low voltage.

13. The display device of claim 11, wherein the first period is longer than the second period and the third period is longer than the fourth period.

14. The display device of claim 11, wherein:
the fourth charge pump is further configured to transition the second gate line from the second voltage to the first voltage during a sixth period;
the first charge pump is further configured to drive the second gate line with the first voltage during a seventh period; and
the second charge pump is further configured to transition the second gate line from the first voltage to the second voltage during an eighth period, and wherein the fifth period occurs before the sixth period, the sixth period occurs before the seventh period and the seventh period occurs before the eighth period.

15. The display device of claim 14, wherein the first period overlaps with the fifth period, the second period overlaps with the sixth period, the third period overlaps with the seventh period and the fourth period overlaps with the eighth period.

16. The display device of claim 11 further comprises first selection circuitry configured to couple the first charge pump, the second charge pump, the third charge pump and the fourth charge pump with the first gate line based on a clock signal.

17. The display device of claim 16 further comprising:
a plurality of source lines coupled to sub-pixels; and
second selection circuitry configured to selectively couple the plurality of source lines with the first charge pump, the second charge pump, the third charge pump, and the fourth charge pump.

18. The display device of claim 11, wherein the first charge pump is configured to output a lower current than the second charge pump, and the third charge pump is configured to output a lower current than the fourth charge pump.

19. A method for updating a display device comprising:
coupling a first gate line of the display device with a first charge pump during a first period and driving the first gate line with a first voltage;
coupling the first gate line with a fourth charge pump during a second period to transition the first gate line from the first voltage to a second voltage;
coupling the first gate line with a third charge pump during a third period and driving the first gate line with the second voltage;
coupling the first gate line with a second charge pump during a fourth period to transition the first gate line from the second voltage to the first voltage; and
coupling a second gate line of the display device with the third charge pump during a fifth period and driving the second gate line with the second voltage,
wherein the first period occurs before the second period, the second period occurs before the third period, the third period occurs before the fourth period, and the fourth period occurs before the fifth period.

20. The method of claim 19 further comprising:
coupling the second gate line with the second charge pump during a sixth period to transition the second gate line from the second voltage to the first voltage;

coupling the second gate line with the first charge pump during a seventh period and driving the second gate line with the first voltage; and coupling the second gate line with the fourth charge pump during a eighth period to transition the second gate line from the first voltage to the second voltage, wherein the fifth period occurs before the sixth period, the sixth period occurs before the seventh period and the seventh period occurs before the eighth period.

* * * * *